Patented Aug. 23, 1932

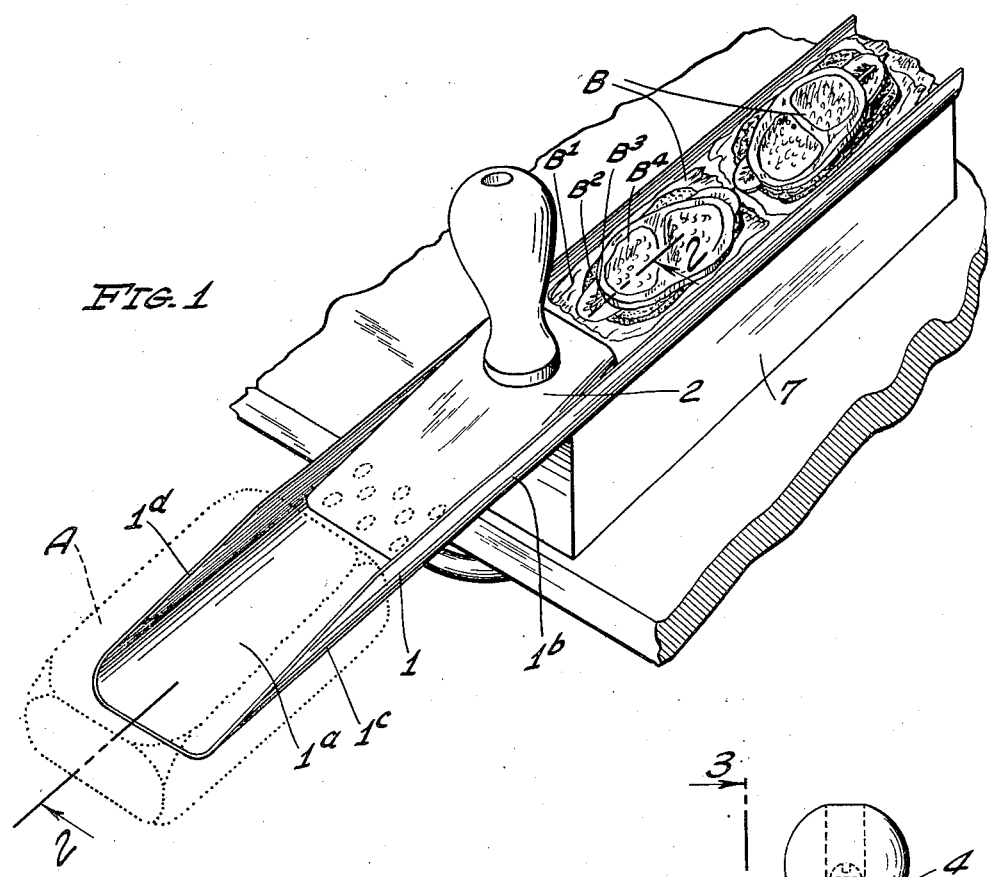
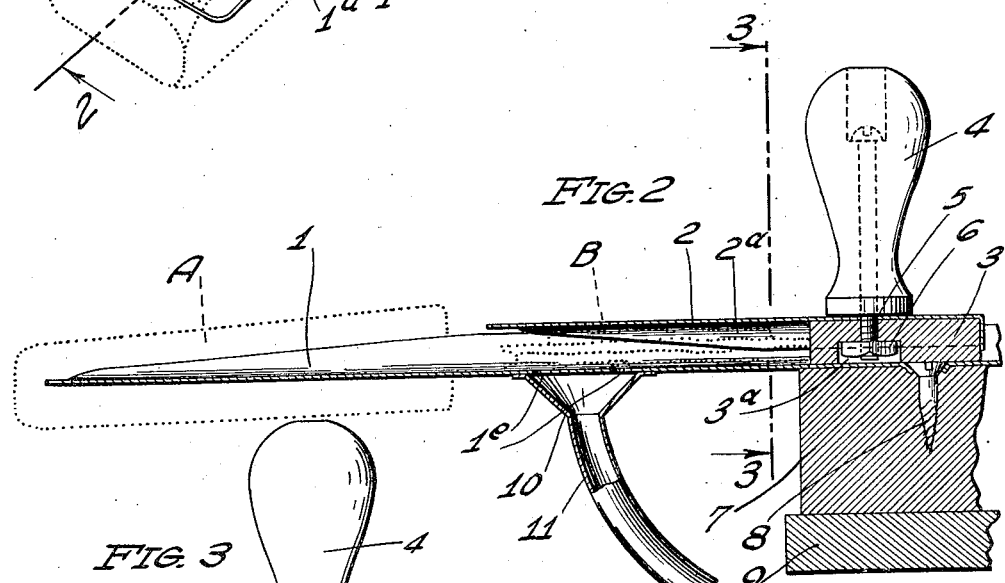
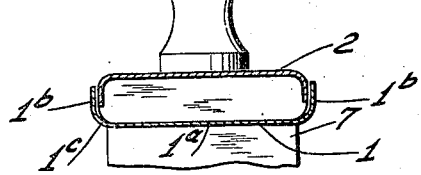

1,873,920

UNITED STATES PATENT OFFICE

KEN E. BEMIS, OF LOS ANGELES, CALIFORNIA, ASSIGNOR, BY MESNE ASSIGNMENTS, TO FOUNTAIN PRODUCTS CORPORATION, A CORPORATION OF ILLINOIS

SANDWICH ASSEMBLING DEVICE

Application filed September 27, 1927. Serial No. 222,246.

My present invention relates to a sandwich assembling device, and the objects of my invention are: first, to provide a device for assembling the filler elements of a sandwich and for inserting the filler within a bun, biscuit, or other sandwich enclosing element; second, to provide a device of this class whereby a sandwich filler may be easily and quickly inserted into a pocket of a bun, or other baked stuff, which pocket is open at one end only; third, to provide a device of this class whereby the sandwich filler may be easily and quickly inserted into the pocket of a bun, or other baked stuff, and whereby the separate elements of the device may be readily removed from the pocket in the bun without disturbing the filler; fourth, to provide a device of this class having a sandwich filler directing portion upon which a bun, or other baked stuff may be strung and other means for inserting the filler within the bun or other baked stuff and simultaneously removing the bun with the filler positioned therein from the filler directing portion of the device; fifth, to provide a device of this class upon which a number of sandwich fillers may be assembled and upon which the same may be retained and displayed until it is desired to make and sell another sandwich; sixth, to provide a device of this class from which the excess juices of the sliced vegetables, or from other sandwich filler elements, may be readily drained before the filler is inserted into the bun, biscuit, or other baked stuff; seventh, to provide, as a whole, a novelly constructed sandwich assembling device; and, eighth, to provide a device of this class which is particularly simple and economical of construction, efficient, practical, durable, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawing and to the characters of reference thereon which form a part of this application in which:

Figure 1 is a perspective view of my sandwich assembling device in its preferred form of construction, showing the same mounted on a table ready for use and showing by dotted lines a bun, slit from one end, placed over the bun receiving and sandwich filler directing end of the device; Fig. 2 is a fragmentary longitudinal sectional view thereof, taken through 2—2 of Fig. 1; and, Fig. 3 is a fragmentary transverse sectional view thereof, taken through 3—3 of Fig. 2.

Like characters of reference refer to similar parts and portions throughout the several views of the drawing.

My sandwich assembling device consists essentially of a sandwich enclosure mounting and filler directing member, and a filler inserting means. The sandwich enclosure mounting and filler directing member consists of a trough member 1 made of relatively heavy and preferably non-corrosive sheet metal with the bottom 1a thereof flat, the side walls or flanges 1b relatively narrow and the corners between the bottom and the side flanges considerably rounded, as indicated by 1c. The forward ends of the side walls or flanges 1b of the member 1, are inclined downwardly at a gradual pitch to a fine edge at the forward end of said member, as is shown in Figs. 1 and 2. This gradually inclined upper edge, or gradually tapered forward end, permits a bun, indicated by A in Fig. 1, and which has been slit from one end to form a pocket enclosed at all sides except at one end, to be slipped or strung over the forward end of the member 1, and, when being placed thereon, to be separated at the split portion to open the pocket at the outer end for inserting the sandwich filler.

The greater portion of the opposite end of the member 1 is mounted with its lower side against the upper side of a supporting block 7 and is preferably secured thereto by a plurality of wood screws 8 extending into the block from the inner side of the trough member, as shown best in Fig. 2. The block 7 may be supported on a table, shelf, or other suitable supporting means.

The sandwich filler inserting means consists of a sheet metal sandwich filler covering and compressing member 2, a filler shifting block 3, a handle 4, a bolt 5 securing the handle, the member 2 and the block 3 together, and a nut 6 securing the bolt in position. The member 2 is shaped substantially as the forward end of the member 1, but is inverted, is slightly narrower than the channel in the member 1 and is placed to slide therein with its narrower side flanges 2a within the flanges 1b of the member 1, substantially as shown. The block 3 is preferably made of wood and is placed at the rear end of the member 2 at the underside thereof and spaces the member 2 from the bottom of the channel formed by the member 1. The handle 4 is relatively large so as to provide a convenient grip for shifting the sandwich filler inserting means and is placed with its lower end against the upper side of the member 2. This handle is secured by the bolt 5 which extends longitudinally through the handle, through the upper side of the member 2 and through the block 3 and is retained in position by the nut 6 at the lower end of the bolt, said nut being placed in a recess 3a at the under side of the block.

The trough member 1 is preferably made of considerable length so that a plurality of sandwich fillers may be assembled at one time in the trough member, as indicated by B in Fig. 1. These sandwich fillers may consist of a garnish B¹, such as lettuce, a meat filler B², a slice of pickle B³, a slice of tomato B⁴, and any other vegetable, garnish, or meat or other equivalent filler. These sandwich filler elements may be retained in the trough member, as shown, until it is desired to make a sandwich, when a bun A, or other similar product, is slipped over the forward end of the trough member, the sandwich filler inserting means placed over one of the sandwich fillers with the block 3 behind the filler and the forward portion of the member 2 above the assembled filler. The filler is then shifted forwardly by the handle 4, the forward end of the member 2 tilted downwardly, as shown best in Fig. 1, and the member 2 inserted into the pocket of the bun and the bun, together with the member 2 and the sandwich filler, with the filler in the pocket of the bun removed from the forward end of the trough member. The member 2 is then removed from the pocket of the bun and the sandwich is then completed. The forward ends of both the trough member 1 and the member 2 serve substantially as a pair of plates between which the sandwich filler is placed and compressed for inserting the sandwich filler in the separated portions or the pocket of the bun.

In Fig. 2 of the drawing, the bun is shown by dotted lines over the forward end of the member 1 and the sandwich filler B is shown by dotted lines below the member 2 and forward of the block 3 before being compressed and inserted into the pocket of the bun.

Certain sliced vegetables, such as tomatoes, pickles, onions, or the like, may create an excess of juices which may be undesirable in the completed sandwich. In order to obviate this inconvenience, I have provided a plurality of perforations 1e in the bottom 1a of the trough member, preferably behind or inwardly from the inner end of the bun, as shown best in Fig. 2, for draining said juices. Below said perforations and secured preferably to the under side of the trough member, is a funnel shaped receiver 10 which terminates at its lower end in a suitable conductor 11 for disposing of the juices.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a sandwich assembling device, a pair of separate plate members positioned opposite and adjacent each other with the one within and substantially enclosed within the transverse outline of the other forming opposite sides of a pocket therebetween for receiving a sandwich filler one member being stationary and adapted to support the filler, and the other being adapted to be shifted longitudinally with respect to the former.

2. In a device of the class described, a trough member, the side walls at one end thereof being tapered downwardly to the end of the trough, and a slide member movable within the trough toward the tapered end, said slide being tiltable relative to said trough member with the upper portion thereof conforming in inclination substantially with the upper portions of the forwardly tapered side walls of the trough member.

3. In a device of the class described, a long shallow trough member, the forward ends of the side walls thereof being tapered towards the forward end and merging substantially with the bottom thereof, and a slide member of inverted trough shape and with similar and oppositely tapered forward and slidably positioned within the trough member.

4. In a device of the class described, a long shallow trough member, the forward ends of the side walls thereof being tapered towards the forward end and merging substantially with the bottom thereof, and a slide member of inverted trough shape and with similar and oppositely tapered forward end slidably positioned within the trough member, said slide member having a handle at the upper side of its rear end.

5. In a device of the class described, a long shallow trough member, the forward ends of the side walls thereof being tapered toward the forward end and merging substantially with the bottom thereof, and a slide member of inverted trough shape and with a similar and oppositely tapered forward end slidably positioned within the trough member, said slide member having an abutment near the rear end of its lower side.

6. In a device of the class described, a long shallow trough member, the forward ends of the side walls thereof being tapered towards the forward end and merging substantially with the bottom thereof, and a slide member of inverted trough shape and with similar and oppositely tapered forward end slidably positioned within the trough member, said slide member having a block at the rear end of its lower side, said block supporting the slide on and from the bottom of the trough member and forming an abutment for shifting a sandwich filler into a sandwich casing.

7. In an assembling device of the class described, a long trough member open at one longitudinal side adapted to receive simultaneously a plurality of fillers therein along the bottom of the trough, each of said fillers being dischargeable independently beyond one end of the trough, and a slide of slightly greater length than the fillers, slidable longitudinally in said trough and partially enclosing the open side of the trough and forming a pocket therewith, said slide being adapted to be variously positioned in the trough over and behind each of the fillers for separately discharging the same beyond the one end of the trough.

8. In a sandwich assembling device, a pair of separate plate members positioned adjacent each other with the one within the other, forming opposite sides of a pocket therebetween for receiving a sandwich filler, said plates being slidable longitudinally relative to each other and also adapted to be tilted longitudinally one within the other, said plate members, when tilted, diverging backwardly from their forward ends.

9. In a sandwich assembling device, a pair of separate plate members positioned adjacent each other with the one within the other, forming a pocket therebetween for receiving a sandwich filler and adapted to be tilted longitudinally one within the other at their rear ends, and to be shifted longitudinally one with respect to the other when tilted.

10. In a device of the class described, a trough member, the side walls thereof at one end being tapered downwardly to the end of the trough, and a slide member movable within the trough toward and beyond the tapered end, said slide being also tiltable longitudinally relative to said trough member, the forward end of the slide being adapted to be positioned near the bottom of the trough when the slide is shifted through the tapered end of the trough.

In testimony whereof, I have hereunto set my hand at Los Angeles, California this 7th day of September, 1927.

KEN E. BEMIS.